Nov. 28, 1967  JIRO ASAHINA  3,354,648
WATER-JET ENGINE

Filed May 17, 1966  6 Sheets-Sheet 1

INVENTOR.
Jiro Asahina

BY Michael S. Striker

Nov. 28, 1967 JIRO ASAHINA 3,354,648
WATER-JET ENGINE
Filed May 17, 1966 6 Sheets-Sheet 5

INVENTOR.
Jiro Asahina
BY
Michael J. Striker

Nov. 28, 1967  JIRO ASAHINA  3,354,648
WATER-JET ENGINE

Filed May 17, 1966  6 Sheets-Sheet 6

PRESSURE CURVE

INVENTOR.
Jiro Asahina
BY

United States Patent Office 3,354,648
Patented Nov. 28, 1967

3,354,648
WATER-JET ENGINE
Jiro Asahina, 1402 Yamanouchi, Kanagawa Prefecture, Kamakura, Japan
Filed May 17, 1966, Ser. No. 550,786
Claims priority, application Japan, Mar. 24, 1966, 41/17,622
27 Claims. (Cl. 60—221)

ABSTRACT OF THE DISCLOSURE

A water jet engine in which an elongated tubular member adapted to move through a body of water is provided intermediate its ends with means of producing a cavitation in the water passing through the tubular member, and in which combustible fuel is fed into the tubular member in the region of the cavitation producing means and in which ignitor means located in the cavitation ignite the fuel so that the combustion gases thus produced will drive the water passing through the tubular member with increased speed out of the rear discharge end of the latter to propel the tubular member in forward direction.

---

This invention relates to a water-jet engine operated by the action of cavitation and using non-compressive fluid, such as water, as the medium.

An object of the present invention is to provide a water-jet engine operated by the action of cavitation so adapted that fuel may be exploded in the cavity due to cavitation generated in the hollow tubular member and that propulsion may be obtained through using the gas pressure generated at the time of such combustion.

Another object of the present invention is to provide a water-jet engine operated by the action of cavitation so constructed that the fluid may be accelerated in passing through a pressure reducing tube section of decreasing cross sectional area provided midway of the hollow tubular member, and that cavitation may be produced effectively in the cavitation-forming tubular portion by such acceleration of the fluid.

A further object of the present invention is to provide a water-jet engine operated by the action of cavitation wherein a submerged ignition plug is provided in the cavitation-forming tube section in which cavitation is presented to bring about continuous ignition and explosion of the combustible fluid and thereby obtain effective propulsion.

A further object of the present invention is to provide a water-jet engine operated by the action of cavitation in which the outward configuration of cavitation generated in the tubular member may be varied as desired, depending upon variation of the configuration of the pressure-reducing tube section.

A further object of the present invention is to provide a water-jet engine operated by the action of cavitation in which gaseous fuel such as butane, propane or the like is used as primary combustible fuel and liquid fuel such as gasoline or the like used additionally while air or other acidic gases is admitted and utilized as supporter of fuel, and in which fuel is enabled to be injected exactly at the position or towards the front side of the cavitation-forming tube section of the member in such a manner that the fuel inlet pipe for a mixture of gaseous fuel with liquid is provided in case of the gaseous fuel forwardly of the cavitation-forming tube section for carburetion and explosion in the cavitation-forming tube section and, in case of liquid fuel, such liquid fuel is immediately let into the inside of the cavitation-forming tube portion for explosion and combustion therein.

A further object of the present invention is to provide a water-jet engine operated by the action of cavitation provided with ignition mechanism which is high in the submerged ignition efficiency and also excellent in durability A further object of the present invention is to provide a water-jet engine operated by the action of cavitation in which provision is made of a slidable valve or open-and-shut intermittent valve in the middle portion of the hollow tubular member, that is, intermediate between the pressure-decreasing and cavitation-forming tube portions thereof to prevent inclination to counter propulsion at time of combustion for promotion of propulsion, and in which a throttle valve system equivalent in action to the lens-throttling mechanism is provided to the cavitation-forming tube section thereby enabling the adjustment of the diameter of the cavitation-forming tube portion.

A further object of the present invention is to provide a water-jet engine operated by the action of cavitation so adapted that the initial propulsion may be obtained by compulsory feeding of water or by the action of the initial ignition system provided to the cavitation-forming section.

A further object of the present invention is to provide a water-jet engine operated by the action of cavitation so adapted that the jet velocity may be adjustable by moderating the outside length of the subsidiary tube insertedly fitted into the rear opening of the tubular hollow member, or in which a front tube is fitted to the front opening of the hollow tubular member for promotion of propulsion.

A further object of the present invention is to provide a water-jet engine operated by the action of cavitation in which the jet tube portion or the rear portion of the hollow tubular member is movable so that, by varying its direction, a bearing rudder may be omitted.

With these objects in view and other objects which will be described hereinafter, some embodiments of the present invention will be described in detail with reference to the attached drawings, in which.

Explaining the embodiment of the present invention with reference to the drawings, 1 is a liquid inlet of the hollow tubular member A, 2 a liquid jet orifice of the same, 3 a pressure-reducing tube section, 4 a cavitation-forming tube section, 5 a submerged ignition system, 6 an enlarged tube section, 7 a pressure-regulating tube section and 8 a jet tube section.

Figure 1A:
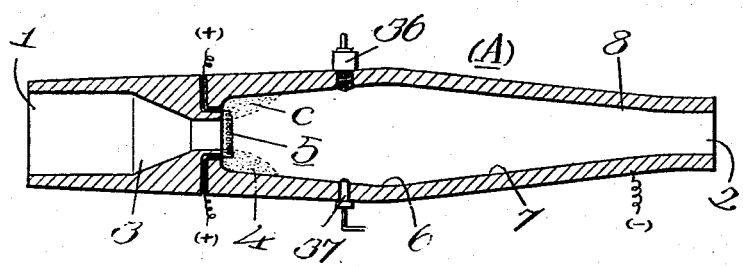
FIGS. 1a to 1c are illustrative views in cross-section showing three embodiments of the water-jet engine operated by the action of cavitation according to the present invention, and views showing the states of cavitation thereof.
Figure 1D:
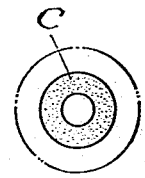
FIGS. 1d–1f are schematic transverse cross-sections taken respectively through FIGS. 1a to 1c in the region of the cavitation.

Among the component parts as specified hereinabove, the pressure-reducing tube section 3 constructed as shown in FIG. 1a has its inside diameter decreased by degrees to lessen the pressure of the influx liquid passing therethrough and to increase its flow velocity. The cavitation-forming tube section 4 of the next stage and coupled to the smallest inner diameter of the pressure-reducing tube section 3 has a gradually increasing inner diameter to generate the cavitation C of the liquid passing therethrough in a tubular or annular configuration and along the inner surface of the cavitation-generating tube section 4 as shown by the pattern indicated by the dotted line. When a central protuberant body 9 in the shape of a cone or of a spindle is provided in such position as to correspond with pressure-reducing tube section 3 by means of a radial support segment 10, as shown in FIG. 1a, a pressure-reducing tube section is formed between the same and the outside wall and a cavitation located back of the central protuberant member 9 and as shown by the dotted pattern. In other words, a cavitation is produced on a line with the center axis of the hollow tubular member A and the combustible gases introduced into the cavitation C can be ignited and exploded by using the submerged ignition plug 5 provided back of the central protuberant body 9.

Figure 1B:
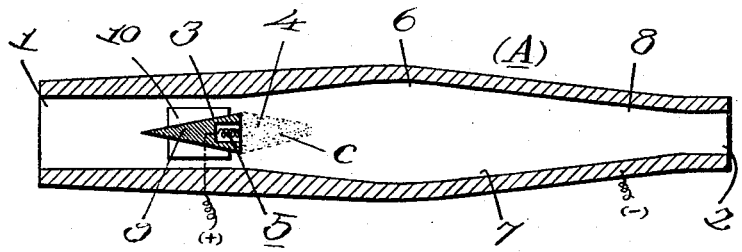
Figure 1E:
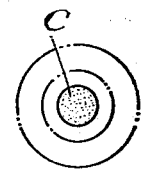
Figure 1C:
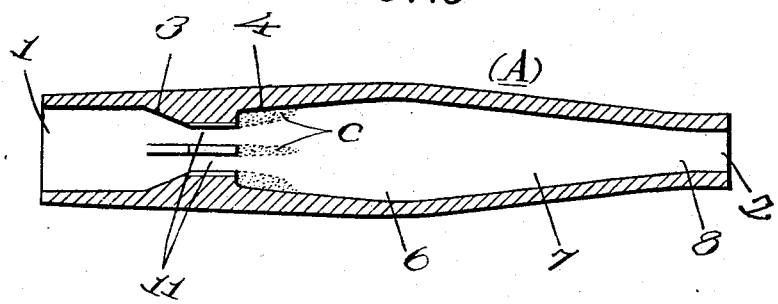
Figure 1F:
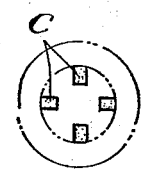

The pressure-reducing tube section 3 illustrated in FIG. 1c corresponds to the member illustrated in FIG. 1b and provided further with a number of channels 11 which run in axial direction of the hollow tubular member, wherein the bore of the tubular member is gradually reduced by slantingly projected parts formed between said pressure-reducing tube channels, resulting in providing a pressure-reducing tube section to the member. It will be noted that the construction of the pressure-reducing tube section 3 itself may be any form in so far as it can provide a portion having a reduced diameter compared to that of the hollow tubular member A at the inlet thereof. Hence, the cavity to be produced at the cavity producing section placed behind the said pressure-reducing section might have, as illustrated in FIGS. 1a, 1b and 1c, either symmetrical or asymmetrical shape.

In the following, the fuel supplying system in the present device will be explained. A gaseous fuel such as butane, propane, and the like in used as a primary fuel, while oxygen or the air is used as an auxiliary fuel.

They are supplied alone or in combination into the member A through its circumferential walls. The practical ways of supplying said fuels are explained in the following, wherein the primary fuel is referred to simply as Gm, and the auxiliary fuel as Gs.

Figure 2A:
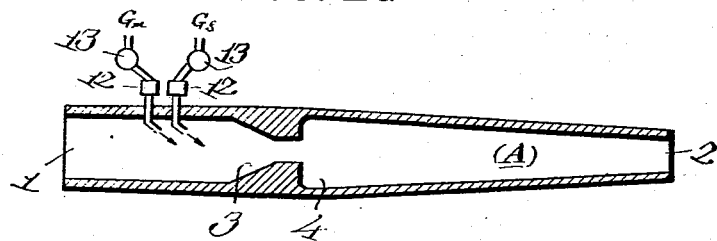
FIGS. 2a to 2d are illustrative views showing four arrangements for supplying the main fuel and supporter for fuel.
Figure 2B:
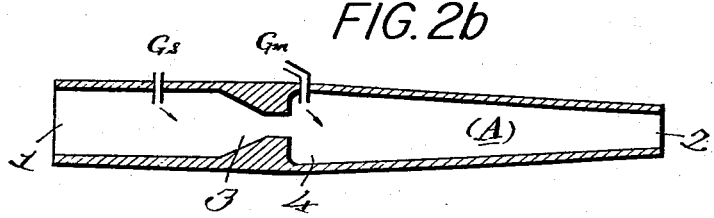
Figure 2C:
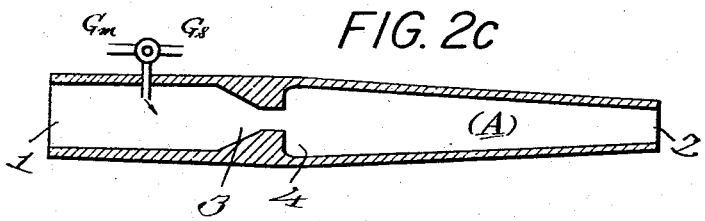

(1) These two fuels, Gm and Gs, are alone or in combination supplied into the member A at its front portion, and vaporized and ignited at the cavity producing section thereof (refer to FIGS. 2a and 2b).

Figure 2D:
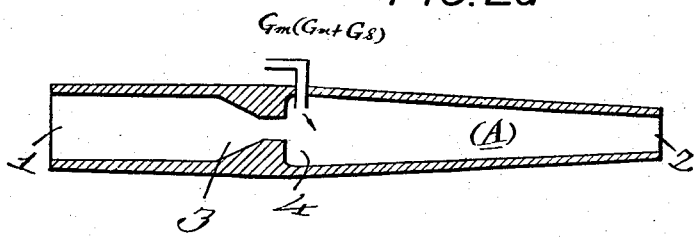

(2) These two fuels are supplied in combination into the cavity producing section 4 of the member A. Or, the primary fuel Gm is solely introduced into the said section and ignited with the help of oxygen existing in the water or the auxiliary fuel Gs which is introduced to the forward part of the hollow tubular member A (refer to FIGS. 2a and 2d).

It should be noted that in either way in the above (1) or (2) the fuel has to be supplied uniformly from the peripheral wall of the member A. The mixing ratio of the primary fuel Gm and auxiliary fuel Gs might be controlled by a suitable controlling means 12, so that said ratio can be kept adequately. In case where the fuel gas is supplied from the forward part of the hollow tubular member A into the member in the form of the combined gas of the primary and auxiliary fuel, it is preferred to supply said gas along the central axis of the member into the water.

With reference to FIGS. 3a to 3e, a submerged ignition mechanism provided inside the cavity producing tubular section 4 is explained in the following.

Figure 3A:
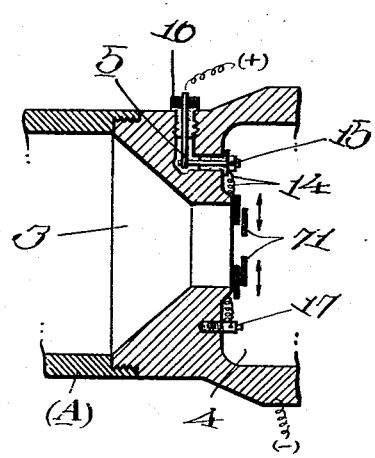
FIGS. 3a to 3e are partly cut side elevational or cross-sectional views showing the substantial parts of the embodiments of the fuel ignition system.
Figure 3B:
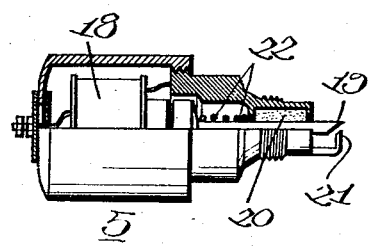

The mechanism illustrated in FIG. 3a is adaptable to the present device in which a cavity is produced in a tubular shape. In the interior of the cavity producing tubular section 4 are provided nichrome wire coils 14 fitted to fixtures for electrodes 15 by heat and water resisting material, one of said fixtures 15 being connected to the other electrode terminal 16 of fixture 15 and a ground connected electrode terminal 17 being connected thereto at the middle part thereof so that the ignition thereof might be made at any time when one desires. The electrode terminals 15 and 17 are made multiple so that the coil 14 might be heated even when the coil is partially down owing to the continuous ignition in the member A. The example illustrated in FIG. 3b is a so-called vibrated contact ignition system utilizing electromagnetically induced vibration effects, wherein movable contact 19 is vibrated by an electromagnet 18 for making intermittent contact between the forward end of the movable contact and the fixed contact 21 insulated by an insulating material 20 and for discharging electricity between the said two contacts and in the cavity C. Particularly in the mechanism illustrated in FIG. 3b, an arc discharge which is deemed to be impossible to be produced in the water, is produceable. The movable contact 19 is resiliently kept disengaged from the stationary contact 21 by a spring 22 provided in the mechanism. The ignition mechanism shown in FIG. 3c has a combustion chamber 23 provided therein, wherein a nichrome wire coil 14 works as an ignition element and is provided inside the combustion chamber. One end of said coil 14 is fitted to the forward end of fuse 24 which leads to the cavity C for the ignition and explosion of the fuel.

Figure 3D:
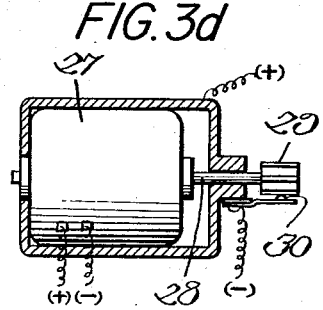
Figure 3C:
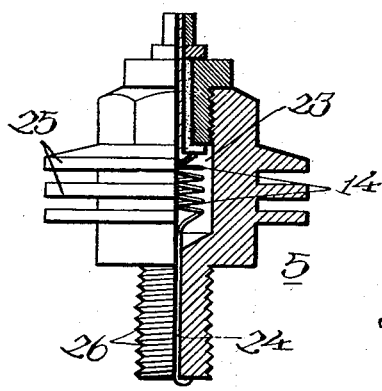
Figure 3E:
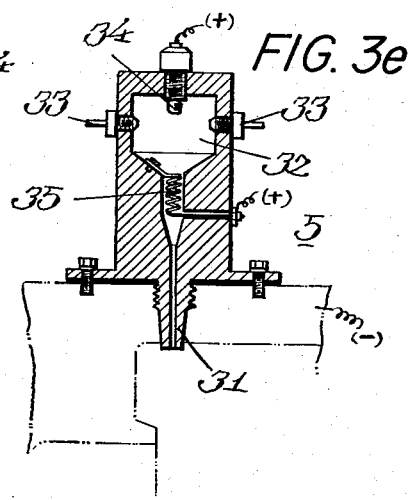

Further, the mechanism shown in FIG. 3d is a submerged ignition plug utilizing the rotary movement of a motor 27, wherein a rotary electrode 28 fitted to the free end of the rotary shaft 28 of the motor intermittently contacts a fixed contact 30 charged by high-voltage electricity so that the sparking can be obtained therebetween. Since the frequency of the sparking might easily be increased or decreased by changing the rotary speed of the motor, it is easily possible to synchronize the frequency of the sparking with the supply of fuel in accordance to the desired force of propulsion of the member. The mechanism shown in FIG. 3e is an ignition system wherein an oil burner and the like is utilized in place of the electric discharge unit described in the aforementioned systems. A nozzle 31 opens to the cavity producing section 4, a supplying tube for a fluid fuel 33 opens into a mixing and combusting chamber 32, and the fuel well combusted by a primary and secondary glow plugs 34 and 35 is injected from the nozzle 31 into the cavity C wherein the fuel is continuously exploded.

Figure 4A:
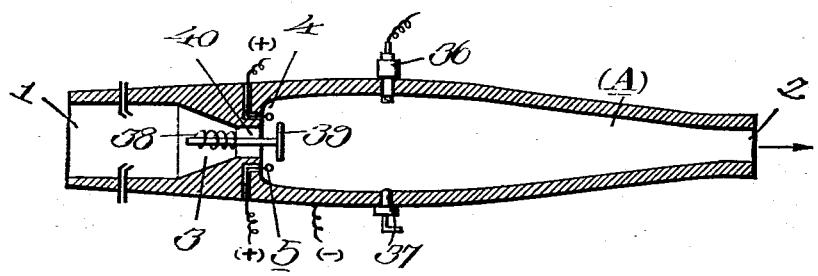
FIGS. 4a to 4c are cross-sectional views showing substantial parts of the initial propulsion mechanism.

Next, the starting means of the present engine will be explained. FIG. 4a illustrates the most simple starting means in which a starting ignition plug 36 is provided at the upper part of the cavity producing section 4 of the member A, a supplying valve 37 for starting fuel which supplies a gaseous fuel partially into the cavity producing section 4 is provided beneath the plug 36, and the plug is ignited in such way that a continuous and slow explosion might be produced. The fuel thus combusted is ejected from the controlling tube 7 through the tube section 8, thereby propelling the vehicle provided with the present engine by the reaction force of the fluid expelled by the gas from the tube section 8. For obtaining a great enough fluid speed to produce the cavitation in the cavity C, a valve member 39 having springs 38 at the front and rear part thereof is, as illustrated in FIG. 4a, provided between the cavity producing section 4 and decompression tube 3, whereby the propulsion force working in the direction opposite to the advancing direction of the member A can be retarded by firmly closing a valve opening 40 by the valve 39. The provision of said valve 39 to the member A increases simultaneously the starting effect of the engine. When the ordinary propulsion is obtained, the valve opening 40 of the valve 39 is opened in accordance with the explosion of the ignition system 5.

Figure 4B:
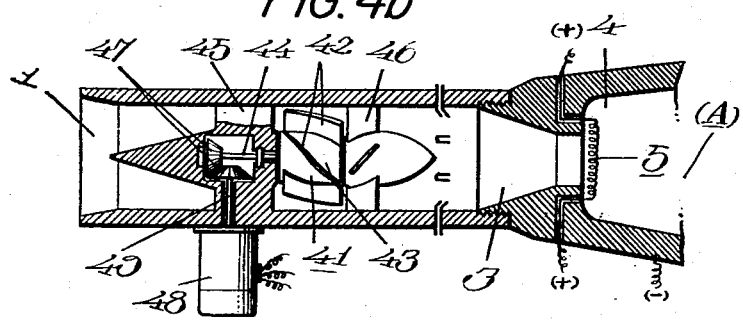

Illustrated in FIG. 4b is a screw mechanism 41, provided in the center of the forward end of the hollow tubular member A, which comprises a rotary member 43 provided with a number of blades 42 projecting from the member, the shaft 44 of said member 43 journaled and supported by supporting legs 45 and 46, a driving motor 48 having a drive shaft 49 and a pair of bevel gears connecting the shafts 44 and 49 for rotating the rotary member 43 in a clockwise or counterclockwise direction by said shaft 49. It is possible to obtain the starting propulsion working either in advancing or retreating direction by simply changing the rotary direction of said shaft 49.

Figure 4C:
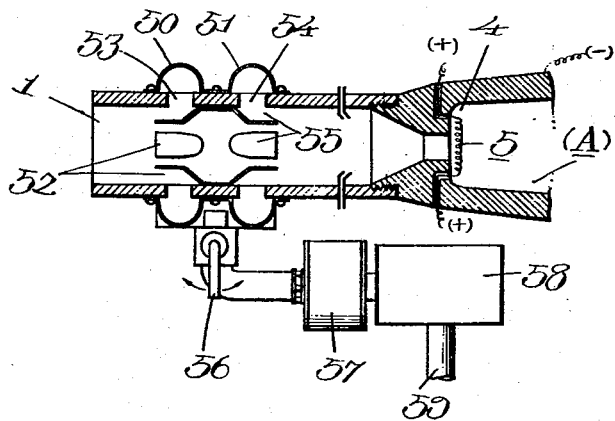

Illustrated in FIG. 4c is a starting mechanism which might be called a jet current starting system, in which two water-conduits 50 and 51 are independently wound over the outer circumferential surface of the member A at around the front part thereof, that is, the part similar to the place described with reference to the FIG. 4b. One of said conduits, that is, the front conduit 50 is led through a bore 53 provided in the wall of the member A and connected to a nozzle for retreating 52 having a number of openings opened into the member A, and the other conduit, that is, the rear conduit 51 is connected to a nozzle for the advance movement 55 through a bore 54. These two conduits are respectively connected to a water supplying tank 57 through a change cock 56. A jet current in a desired direction is obtainable by introducing water either into the conduit 50 or 51 by a motor 58 which operates to suck water through a suction pipe 59.

Figure 5:
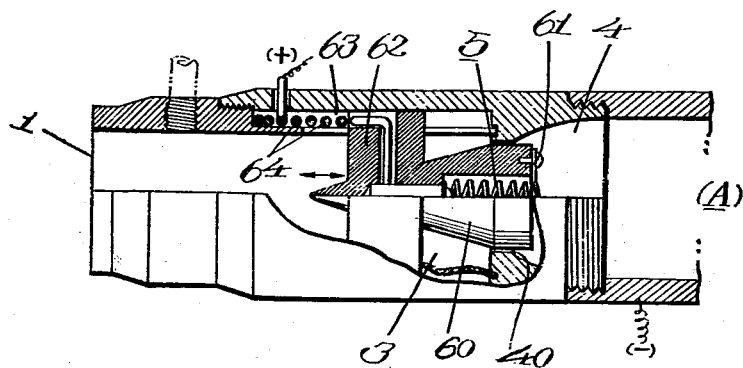
FIG. 5 is a partly cut cross-sectional view showing substantial parts of the valve-actuating mechanism.

Illustrated in FIG. 5 is a mechanism in which a pressure reducing tubular section 3 is movable and in which the means illustrated in FIG. 1b and FIG. 4a are combined. The centrally expanded body 9 in FIG. 1b which forms the pressure reducing tubular portion 3 is made as a movable body 60 performing also the function of a valve and having a conically projected front head and a rear end which can register with the valve opening 40 when the former is inserted into the latter, and can close the valve opening. The free end of supporting leg 62 fitted to the movable body 60 is slidably inserted into the channels 63 of the wall of the member A so that the movable body can be shifted to a desired place in the body. A spring 64 can be, as illustrated in the figure, fitted into the channel 63 abutting against the supporting leg 62. Inside the part of the movable body 60 working as a valve member 61 is provided a submerged ignition mechanism 5 as explained in the foregoing.

Figure 6:
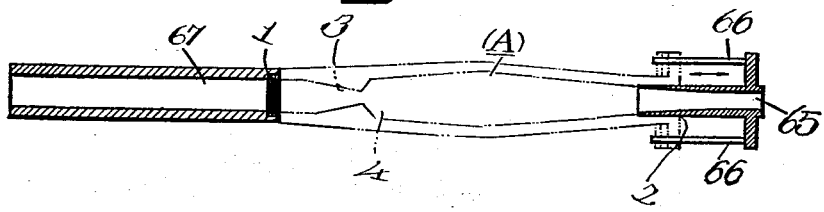
FIG. 6 is a cross-sectional view of the tubular fixture provided to the front and rear of the hollow tubular vessel.

In an embodiment of the present invention an additional tube 65 is attached to the free rear end of the hollow tubular member A, as illustrated in FIG. 6. Since said additional tube 65 is movably inserted into the member A and connected thereto by operating rods 66 fitted to the additional tube, the injection speed or velocity thereof may freely be controlled. An additional front tube 67 can also be provided to the front of the member A in order to make the propulsion thereof larger.

Figure 7:
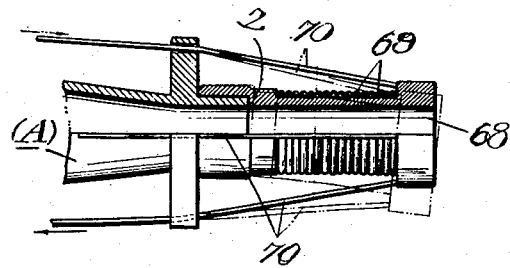
FIG. 7 is a partly cut side elevational view of the movable jet orifice the jet direction of which may be varied.

In FIG. 7, the hollow tubular member A is fitted at its rear injection opening 2 with a flexible tube 68 made from a plastic material such as rubber or synthetic resins, the connecting portion of said injection opening and flexible tube being reinforced with a coil spring 69. The flexible tube 68 can be bent horizontally as well as vertically to any desired direction by remotely controlled pulling or wire ropes 70 fitted to the flexible tube 68, whereby a rudder, especially in a small size ship and submarine can be eliminated.

Figure 8A:
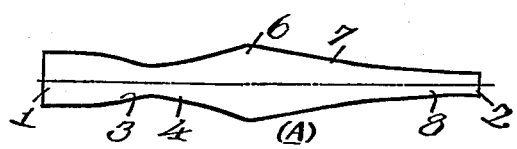
FIGS. 8a and 8b are diagrams indicating respectively details of design of the hollow tubular vessel and the hydraulic head curves based thereon.
Figure 8B:
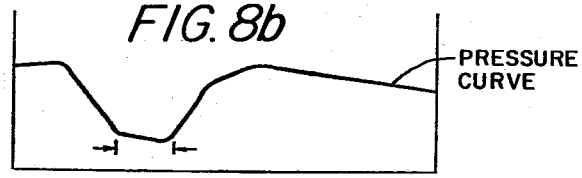

Though the various constructions and embodiments of the present invention device have been explained with reference to the accompanying drawings, it is essential in the present invention to provide the engine with such constructions which can give a hydraulic pressure head curve as shown in the diagram in FIG. 8b wherein the pressure is given on the longitudinal axis of the diagram and the fluid is on the horizontal axis, in case where the section 4 of the tubular body A has the contour as illustrated in FIG. 8a.

Figure 9:
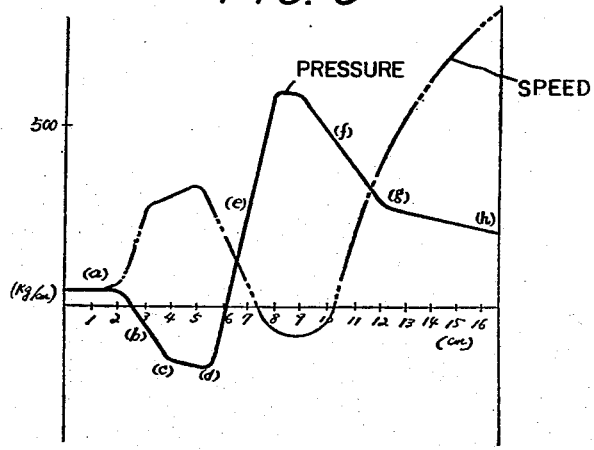
FIG. 9 is a diagram indicating pressure distribution curve at the time of its operation.

In the above described constructions of the present invention device will operate as follows:

The water supplied to the fluid inlet 1 which is provided to the front end of the hollow tubular body A increases its flow speed when it passes through the pressure reducing tubular section 3, and the pressure of the water decreases resulting in producing a cavitation in the section 4 of the member A. The submerged ignition system provided in said section 4 ignites the fuel. The variation of pressure in the present invention engine is given by solid lines in FIG. 9, wherein $a$ indicates the point where the fuel is supplied into the member, $b$ the point where the fluid with the fuel is compressed, $c$ the point where cavitation is produced, $d$ the point where the ignition is made, $e$ the point where the explosion is made, and $f$, $g$, and $h$ the points where the flowing velocity of the fluid increases. The variation of the speed thereof is also given by chained lines in FIG. 9.

What is claimed is:

1. A water jet engine comprising, in combination, an elongated tubular member having a leading inlet end and a trailing discharge end, so that when said member is propelled through a body of water, water will pass through said tubular member from said inlet to said discharge end; cavitation producing means in said tubular member intermediate the ends thereof for producing during fast forward movement of said tubular member a cavitation rearwardly of said means; means for continuously feeding fuel into the interior of the tubular member in the region of said cavitation producing means; and ignition means located in the cavitation produced by said cavitation producing means for igniting the fuel so that the combustion gases produced will drive the water passing through the tubular member with increased speed out of said discharge end to provide a forward thrust for said tubular member.

2. A water jet engine as defined in claim 1, wherein said cavitation producing means is constructed and arranged to gradually decrease the flow passage through the tubular member in direction from said inlet to said outlet end and having an endface extending substantially normal to the axis of said tubular member and facing away from said inlet end so as to produce rearwardly of said endface said cavitation.

3. A water jet engine as defined in claim 2, wherein said cavitation producing means comprises wall portions integral with said tubular member and having inner surfaces tapering toward said discharge end.

4. A water jet engine as defined in claim 3, wherein said cavitation producing means comprises an annular wall portion having an inner frusto-conical surface.

5. A water jet engine as defined in claim 3, wherein said wall portions are constituted by a plurality of ribs circumferentially spaced from each other.

6. A water jet engine as defined in claim 2, wherein said cavitation producing means comprises a conical member fixedly arranged within and substantially coaxial with the axis of said tubular member radially spaced from the inner surface thereof and having an apex facing said inlet end.

7. A water jet engine as defined in claim 1, wherein the inner diameter of the tubular member gradually increases rearwardly of said cavitation producing means up to a maximum inner diameter and gradually decreases from said maximum inner diameter toward said discharge end.

8. A water jet engine as defined in claim 2, and including additional means for further reducing the crossection of said reduced flow-passage of said cavitation producing means.

9. A water jet engine as defined in claim 1, wherein said means for feeding fuel into the interior of said tubular member comprises a single conduit adapted to feed a mixture of combustible material and a combustion sustaining agent into said tubular member.

10. A water jet engine as defined in claim 9, wherein said conduit communicates with the interior of said tubular member upstream of said cavitation producing means.

11. A water jet engine as defined in claim 9, wherein said conduit communicates with the interior of said tubular member downstream of said cavitation producing means so as to feed said material and said agent directly into the cavitation produced by said cavitation producing means.

12. A water jet engine as defined in claim 1, wherein said means for feeding fuel into the interior of said tubular member comprises two conduits respectively adapted to feed combustible material and a combustion sustaining agent into said tubular member.

13. A water jet engine as defined in claim 12, wherein said two conduits communicate with said interior of said tubular member upstream of said cavitation producing means.

14. A water jet engine as defined in claim 12, wherein the conduit adapted to feed the combustion sustaining agent into said tubular member communicates with the interior of the latter upstream of the cavitation producing means and the other conduit feeds the combustible material directly into the cavitation produced by said cavitation produced means.

15. A water jet engine as defined in claim 1, wherein said ignition means comprise a heating wire located in the cavitation produced by said cavitation producing means and contact means connected at one end to said heating wire and adapted to be connected at the other end thereof to a source of electrical energy.

16. A water jet engine as defined in claim 1, wherein said ignition means comprises means for producing electrical sparks in said cavitation.

17. A water jet engine as defined in claim 16, wherein said spark producing means comprise a stationary contact, a movable contact, and means connected to said movable contact for reciprocating the latter toward and away from said stationary cnotact.

18. A water jet engine as defined in claim 16, wherein said spark producing means comprise a spring pressed contact, rotatable contact means, and means connected to said rotatable contact means for rotating the latter relative to said spring pressed contact.

19. A water jet engine as defined in claim 1, wherein said ignition means comprise means for heating part of the fuel and for injection the heated fuel in a jet into the cavitation.

20. A water jet engine as defined in claim 1, and including means for starting propelling of the tubular member through a body of water.

21. A water jet engine as defined in claim 20, wherein said starting means comprise an initial firing plug located between said cavitation producing means and said discharge end, and means for feeding fuel into the region of said firing plug.

22. A water jet engine as defined in claim 21, and including valve means in the interior of said tubular member upstream of said firing plug for temporarily closing the flow passage through the tubular member during operation of said firing plug.

23. A water jet engine as defined in claim 20, wherein said starting means comprise propeller means located in the interior of said tubular member upstream of said cavitation producing means and drive means connected to said propeller for rotating the same.

24. A water jet engine as defined in claim 20, wherein said starting means comprise water jet means communicating with the interior of said tubular member upstream of said cavitation producing means and pump means for pumping water from said body of water into said water jet means.

25. A water jet engine as defined in claim 1, and including an additional tubular member connected to said discharge end of said one tubular member.

26. A water jet engine as defined in claim 25, wherein said additional tubular member is inserted with its front end in said tubular member and including means connected to said additional tubular member for moving the same in axial direction relative to said one tubular member.

27. A water jet engine as defined in claim 25, wherein said additional tubular member is constructed and arranged so as to be tiltable with regard to said one tubular member and including means connected to said additional tubular member for tilting the same relative to said one tubular member.

References Cited

UNITED STATES PATENTS

| | | | |
|---|---|---|---|
| 2,974,626 | 3/1961 | Zwicky | 60—221 X |
| 3,141,296 | 7/1964 | Jacobs et al. | 60—221 X |
| 3,163,980 | 1/1965 | Turner | 60—221 |

FOREIGN PATENTS

| | | |
|---|---|---|
| 589,726 | 2/1925 | France. |
| 952,033 | 4/1949 | France. |
| 533,953 | 10/1955 | Italy. |

OTHER REFERENCES

Space/Aeronautics, January 1960, pp. 68–71.

CARLTON R. CROYLE, *Primary Examiner.*